United States Patent
Sato et al.

(10) Patent No.: US 9,589,341 B2
(45) Date of Patent: *Mar. 7, 2017

(54) INFORMATION PROCESSOR, INFORMATION PROCESSING METHOD, AND PROGRAM

(71) Applicant: c/o SONY CORPORATION, Tokyo (JP)

(72) Inventors: Tatsuhito Sato, Tokyo (JP); Tomohiko Gotoh, Kanagawa (JP); Daisuke Mochizuki, Chiba (JP); Shunsuke Mochizuki, Tokyo (JP); Yun Sun, Tokyo (JP); Yuki Okamura, Saitama (JP); Takeshi Yaeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,923

(22) Filed: Jul. 21, 2015

(65) Prior Publication Data
US 2015/0324971 A1  Nov. 12, 2015

Related U.S. Application Data

(63) Continuation of application No. 13/549,903, filed on Jul. 16, 2012, now Pat. No. 9,104,943.

(30) Foreign Application Priority Data

Sep. 5, 2011 (JP) ................. 2011-192336

(51) Int. Cl.
G06K 9/00 (2006.01)
G06T 7/00 (2006.01)
(Continued)

(52) U.S. Cl.
CPC .......... G06T 7/0004 (2013.01); G06K 9/4642 (2013.01); G06K 9/6269 (2013.01);
(Continued)

(58) Field of Classification Search
CPC ...... G06T 7/0004; G06T 11/60; G06K 9/6269
(Continued)

(56) References Cited

U.S. PATENT DOCUMENTS 7,526,100 B1 * 4/2009 Hartman ............... G06K 9/3241
382/103
2003/0076983 A1 * 4/2003 Cox .................... G06F 19/3475
382/110
(Continued)

*Primary Examiner* — Samir Ahmed
(74) *Attorney, Agent, or Firm* — Chip Law Group

(57) ABSTRACT

An information processor includes a detection unit detecting a photographic subject region of an image, a characteristic amount generation unit generating a characteristic amount including at least positional information of the photographic subject region for each of the detected photographic subject region, a combined characteristic amount generation unit generating a combined characteristic amount corresponding to the image by combining the characteristic amount generated for each of the photographic subject region, and an identification unit identifying a label corresponding to a combination of a photographic subject appearing in the image based on the generated combined characteristic amount.

10 Claims, 16 Drawing Sheets

(51) Int. Cl.
  *G06T 11/60* (2006.01)
  *G06K 9/62* (2006.01)
  *G06K 9/46* (2006.01)

(52) U.S. Cl.
  CPC .... *G06T 11/60* (2013.01); *G06T 2207/10004* (2013.01); *G06T 2207/30128* (2013.01)

(58) Field of Classification Search
  USPC .............................. 382/159, 195; 700/47, 48
  See application file for complete search history.

(56) References Cited

U.S. PATENT DOCUMENTS

| | | | | |
|---|---|---|---|---|
| 2010/0111383 A1* | 5/2010 | Boushey | ................. | A23L 1/293 382/128 |
| 2010/0173269 A1* | 7/2010 | Puri | ................... | G09B 19/0092 434/127 |
| 2011/0318717 A1* | 12/2011 | Adamowicz | ....... | G09B 19/0092 434/127 |
| 2012/0093396 A1* | 4/2012 | Dai | ...................... | G06K 9/6262 382/159 |
| 2012/0096405 A1* | 4/2012 | Seo | .................... | G06F 3/04886 715/825 |
| 2012/0135384 A1* | 5/2012 | Nakao | ................ | G09B 19/0092 434/127 |
| 2012/0170801 A1* | 7/2012 | De Oliveira | ......... | G06K 9/6256 382/103 |

\* cited by examiner

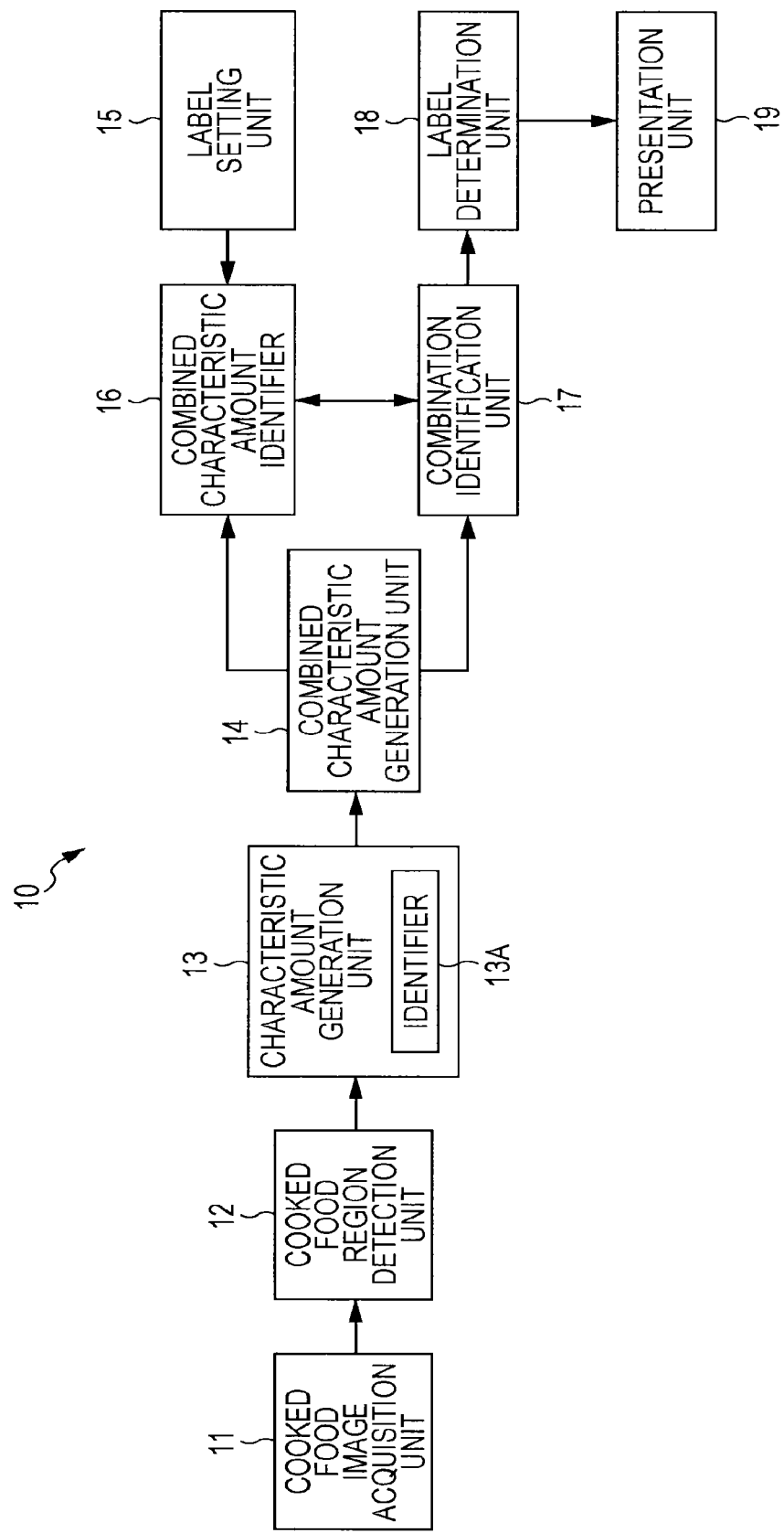

| NAME | TYPE | VALUE RANGE |
|---|---|---|
| TYPE OF COOKED FOOD PLATE | dish-id | [0 – 1] |
| POSITION OF COOKED FOOD REGION | x | [0.0 – 1.0] |
| | y | [0.0 – 1.0] |
| SIZE OF COOKED FOOD REGION | area | [0.0 – 1.0] |
| ANGLE OF COOKED FOOD REGION | rad | [0 – π] |

FIG. 7

| COOKED FOOD CLASS |
|---|
| COOKED RICE |
| BOWL OF RICE WITH TOPPINGS |
| BEAN PASTE SOUP |
| SOUP |
| THICK WHEAT NOODLE |
| BUCKWHEAT NOODLE |
| RAMEN NOODLE |
| PASTA |
| MEAT DISH |
| SEAFOOD DISH |
| VEGETABLE DISH |
| SALAD |
| FRUIT |
| DESSERT |
| BEVERAGE |
| BOXED MEAL |

} 16 CLASSES

FIG. 8

| NAME | TYPE | VALUE RANGE |
|---|---|---|
| TYPE OF COOKED FOOD PLATE | dish-id | [0 – 1] |
| POSITION OF COOKED FOOD REGION | x | [0.0 – 1.0] |
| | y | [0.0 – 1.0] |
| SIZE OF COOKED FOOD REGION | area | [0.0 – 1.0] |
| ANGLE OF COOKED FOOD REGION | rad | [0 – $\pi$] |
| COOKED FOOD CLASS | COOKED RICE | [−1,1] |
| | BOWL OF RICE WITH TOPPINGS | [−1,1] |
| | BEAN PASTE SOUP | [−1,1] |
| | SOUP | [−1,1] |
| | THICK WHEAT NOODLE | [−1,1] |
| | BUCKWHEAT NOODLE | [−1,1] |
| | RAMEN NOODLE | [−1,1] |
| | PASTA | [−1,1] |
| | MEAT DISH | [−1,1] |
| | SEAFOOD DISH | [−1,1] |
| | VEGETABLE DISH | [−1,1] |
| | SALAD | [−1,1] |
| | FRUIT | [−1,1] |
| | DESSERT | [−1,1] |
| | BEVERAGE | [−1,1] |
| | BOXED MEAL | [−1,1] |

FIG. 17

| COOKED FOOD CATEGORY CLASS |
| --- |
| JAPANESE CUISINE |
| CHINESE CUISINE |
| KOREAN CUISINE |
| THAI CUISINE |
| VIETNAMESE CUISINE |
| INDONESIAN CUISINE |
| MALAY CUISINE |
| INDIAN CUISINE |
| TURKEY CUISINE |
| ITALIAN CUISINE |
| SPANISH CUISINE |
| FRENCH CUISINE |
| GERMAN CUISINE |
| RUSSIAN CUISINE |
| AMERICAN CUISINE |
| HAWAIIAN CUISINE |
| MEXICAN CUISINE |
| BRAZILIAN CUISINE |

} 18 CLASSES

INFORMATION PROCESSOR, INFORMATION PROCESSING METHOD, AND PROGRAM

CROSS-REFERENCE TO RELATED APPLICATION

The present application is a continuation of U.S. patent application Ser. No. 13/549,903 filed on Jul. 16, 2012 which claims priority from Japanese Patent Application No. JP 2011-192336 filed in the Japanese Patent Office on Sep. 5, 2011, the entire content of which is incorporated herein by reference.

BACKGROUND

The present disclosure relates to an information processor, an information processing method, and a program, and more specifically relates to an information processor, an information processing method, and a program that are capable of identifying a cooked food appearing in an image.

In related art, there have been cooked food image analysis techniques that identify the type of target cooked food (what the target cooked food is) by analyzing an image obtained by imaging a cooked food. Such a cooked food image analysis technique in the past is applied to, for example, a system to check the intake calories when eating and the like.

In the system, information, such as intake calories due to eating of a cooked food, is notified from a predetermined server to a mobile terminal with a camera of a user by, for example, imaging a cooked food served in a restaurant using the mobile terminal with a camera and notifying the server of an image of a cooked food and information on the restaurant (for example, refer to Japanese Unexamined Patent Application Publication No. 2004-118562).

SUMMARY

The cooked food image analysis technique in the past described above, when a plurality of cooked foods appear in an image, used to process individual identification of the respective type for each cooked food without considering the combination of the cooked foods appearing at the same time.

It is desirable to utilize a combination of cooked foods to be eaten at the same time, thereby enabling identification of cooked foods in an image with higher accuracy.

An information processor according to an embodiment of the present disclosure includes a detection unit detecting a photographic subject region of an image, a characteristic amount generation unit generating a characteristic amount including at least positional information of the photographic subject region for each of the detected photographic subject region, a combined characteristic amount generation unit generating a combined characteristic amount corresponding to the image by combining the characteristic amount generated for each of the photographic subject region, and an identification unit identifying a label corresponding to a combination of a photographic subject appearing in the image based on the generated combined characteristic amount.

The information processor according to another embodiment of the present disclosure can further include a combined photographic subject identifier carrying out machine learning using the label and the combined characteristic amount corresponding to an image for learning as inputs. It is possible that the identification unit identifies the label corresponding to the combination of the photographic subject appearing in the image using the combined photographic subject identifier learned in advance based on the generated combined characteristic amount.

It is possible that the characteristic amount generation unit generates the characteristic amount by combining at least the positional information of the photographic subject region and an identification result of the individual photographic subject in the photographic subject region for each of the detected photographic subject region.

It is possible that the characteristic amount generation unit generates the characteristic amount by combining at least the positional information of the photographic subject region and an image characteristic of the photographic subject region for each of the detected photographic subject region.

It is possible that the positional information of the photographic subject region includes at least one of a shape, center coordinates, a size, or gradient of the photographic subject region.

It is possible that the image is a cooked food image having a cooked food as the photographic subject, and the detection unit detects a region in which a plate appears in the cooked food image as the photographic subject region.

An information processing method according to another embodiment of the present disclosure, in an information processing method carried out by an information processor, includes detecting a photographic subject region in an image, generating a characteristic amount including at least positional information of the photographic subject region for each of the detected photographic subject region, generating a combined characteristic amount corresponding to the image by combining the characteristic amount generated for each of the photographic subject region, and identifying a label corresponding to a combination of a photographic subject appearing in the image based on the generated combined characteristic amount.

A program according to another embodiment of the present disclosure causes a computer to execute functions including a detection unit detecting a photographic subject region in an image, a characteristic amount generation unit generating a characteristic amount including at least positional information of the photographic subject region for each of the detected photographic subject region, a combined characteristic amount generation unit generating a combined characteristic amount corresponding to the image by combining the characteristic amount generated for each of the photographic subject region, and an identification unit identifying a label corresponding to a combination of a photographic subject appearing in the image based on the generated combined characteristic amount.

In an embodiment of the present disclosure, a photographic subject region in an image is detected, a characteristic amount including at least positional information of the photographic subject region is generated for each of the photographic subject region thus detected, a combined characteristic amount corresponding to the image is generated by combining the characteristic amount generated for each of the photographic subject region, and a label corresponding to a combination of a photographic subject appearing in the image is identified based on the combined characteristic amount thus generated.

According to an embodiment of the present disclosure, it is possible to identify a cooked food in an image.

According to another embodiment of the present disclosure, it is possible to identify a combination of cooked foods in an image.

BRIEF DESCRIPTION OF THE DRAWINGS

FIG. 2 is a block diagram illustrating a configuration example of a cooked food identification device having an embodiment of the present disclosure applied thereto;

FIG. 7 shows one example of cooked food classes;

FIG. 8 illustrates a characteristic amount of a cooked food region;

FIG. 17 shows cooked food category classes; and

DETAILED DESCRIPTION OF EMBODIMENTS

A detailed description is given below to best modes (hereinafter, referred to as embodiments) for carrying out an embodiment of the present disclosure with reference to the drawings.

1. Embodiment

An outline of a cooked food identification device, which is an embodiment, is described first.

In general, cooked foods are understood to have the following correlation. For example, as the correlation between a cooked food and a serving method, cooked rice as the staple food and bean paste soup are often served on a front side from a main dish and a side dish as accompanying dishes. As the correlation between a cooked food and a plate to have it placed thereon, a seafood dish is often placed on a rectangular plate. As the correlation between cooked foods eaten at the same time, there are fewer combinations between cooked foods providing both the staple food and an accompanying dish together. Naturally, there are a large number of exceptions not conforming to the correlation described above.

As seen above, cooked foods have correlation with a served position, a shape of a plate to have it placed thereon, a combination with a cooked food eaten at the same time, and the like. It is considered that, utilizing such correlation, identification accuracy can be improved more than identification of a type simply by analyzing only the graphical characteristics of a target cooked food.

With that, in a cooked food identification device as an embodiment, utilizing such correlation, a cooked food is identified not as a single object but as a combination of a plurality of cooked foods.

Figure 1A:
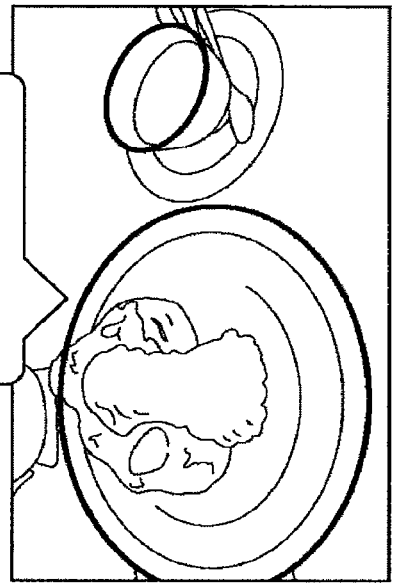
FIGS. 1A, 1B, and 1C illustrate identification results of combinations of cooked foods for cooked food images.
Figure 1B:
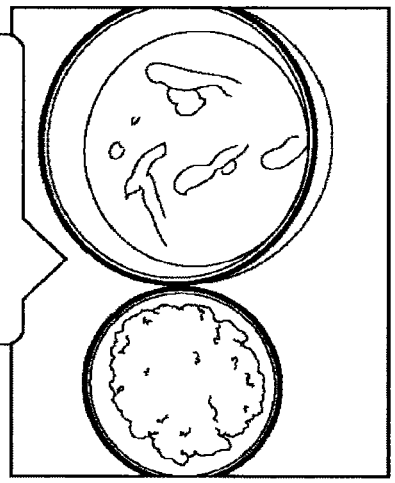
Figure 1C:
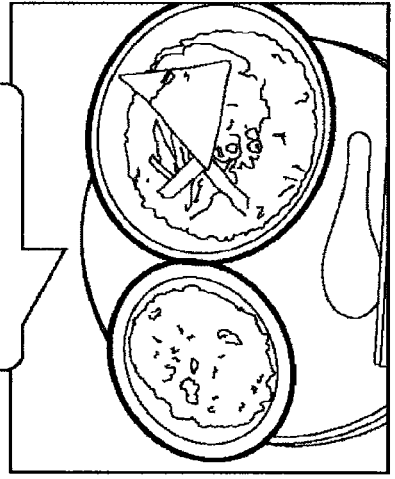

FIGS. 1A, 1B, and 1C illustrate identification results of identifying a plurality of cooked foods appearing in a cooked food image as a combination of cooked foods. In FIG. 1A, ramen noodle and fried rice appear, and when this image is subjected to identification, it is not identified as ramen noodle for one of the cooked foods and as fried rice for the other cooked food, but it is identified as "ramen noodle, fried rice" for the entire image as a combination of cooked foods. In the indications of cooked food combination, one occupying a larger area in the image is written first (on the left). Accordingly, after identifying a cooked food combination, it is possible to identify a cooked food occupying a larger area in the image as ramen noodle and to identify the other cooked food as fried rice.

Similarly in FIG. 1B, bean paste soup and cooked rice are not identified as single objects, but the entire image is identified as a cooked food combination "bean paste soup, cooked rice". It is similar for FIG. 1C.

[Configuration Example of Cooked Food Identification Device]

FIG. 2 illustrates a configuration example of a cooked food identification device as an embodiment. The cooked food identification device 10 is configured with a cooked food image acquisition unit 11, a cooked food region detection unit 12, a characteristic amount generation unit 13, a combined characteristic amount generation unit 14, a label setting unit 15, a combined characteristic amount identifier 16, a combination identification unit 17, a label determination unit 18, and a presentation unit 19.

The cooked food image acquisition unit 11 acquires a cooked food image for learning in learning process to make the combined characteristic amount identifier 16 subjected to machine learning to output it to the cooked food region detection unit 12. It should be noted that the cooked food image for learning is prepared in which a combination of cooked foods corresponding to any of cooked food combination classes described later appears as a photographic subject. The cooked food image acquisition unit 11 acquires a cooked food image subjected to identification (image in which one or more cooked foods are taken as photographic subjects) in identification process identifying a combination of cooked foods appearing in the cooked food image to output it to the cooked food region detection unit 12.

The cooked food region detection unit 12 detects a region in which cooked foods appear (cooked food region) in the cooked food image to output a detection result to the characteristic amount generation unit 13. Specifically, the shape of a plate to have a cooked food placed thereon is assumed as a circular (including elliptic) or rectangular plate, and a circular, elliptic, or rectangular plate is detected as the cooked food region from the cooked food image. A user may also be allowed to delete a detected cooked food region or add a user specified region as a cooked food region.

Figure 3A:
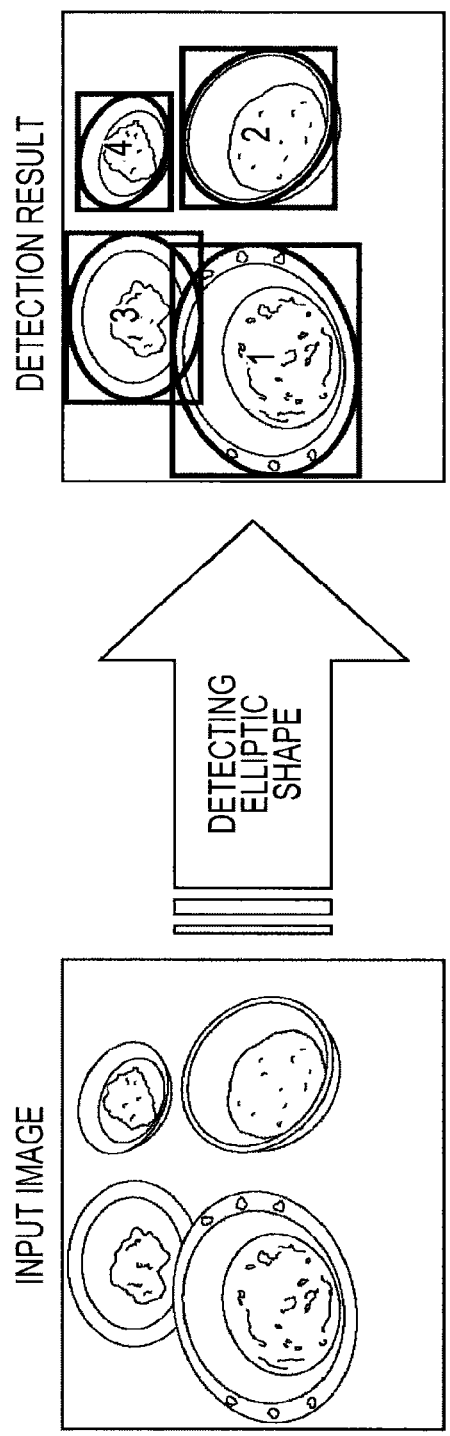
FIGS. 3A and 3B illustrate detection of cooked food regions.
Figure 3B:
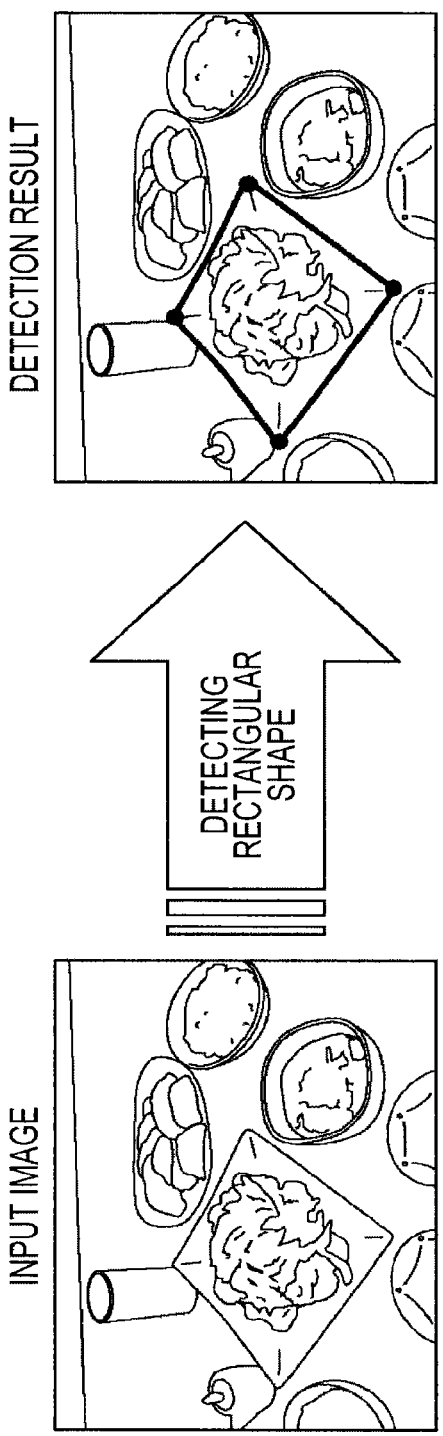

FIGS. 3A and 3B illustrate an example of detecting a circular, elliptic, or rectangular plate from a cooked food image as the cooked food region. As illustrated in FIG. 3A, when there is a plurality of cooked food regions (in the current case, elliptic plates) in the cooked food image, a number is given to show the order of larger areas among them. FIG. 3B illustrates a condition of detecting a rectangular plate from the cooked food image as the cooked food region. The shape of the plate to be detected as the cooked food region is not limited to circular, elliptic, or rectangular but it may also be polygonal or the like.

Figures 4, 5:
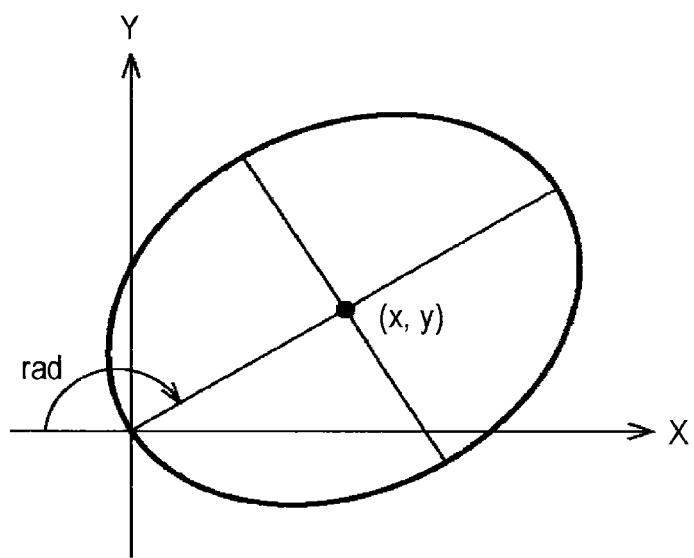
FIG. 4 shows items included in a detection result in a cooked food region.
FIG. 5 illustrates a detection result in a circular cooked food region.

FIG. 4 shows items included in a detection result of the cooked food region. A detection result of the cooked food region includes five items: dish-id representing a type of plate, x and y representing a position of a cooked food region, area representing a size of the cooked food region, and rad representing an angle of the cooked food region. In other words, a detection result of the cooked food region can be expressed in a five dimensional vector.

The dish-id representing the type of plate is 0 (a circular (including elliptic) shape) or 1 (a rectangular shape). The x and y representing the position of the cooked food region is a value obtained by normalizing the center coordinates of the cooked food region in the cooked food image by the size of the cooked food image, which is a value between 0.0 and 1.0. The area representing the size of the cooked food region is a value obtained by normalizing the area of the cooked food region by the area of the entire cooked food image, which is a value between 0.0 and 1.0. The rad representing the angle of the cooked food region is an angle between the X axis and a longer side of the cooked food region, which is a value between 0 and n.

Figure 6:
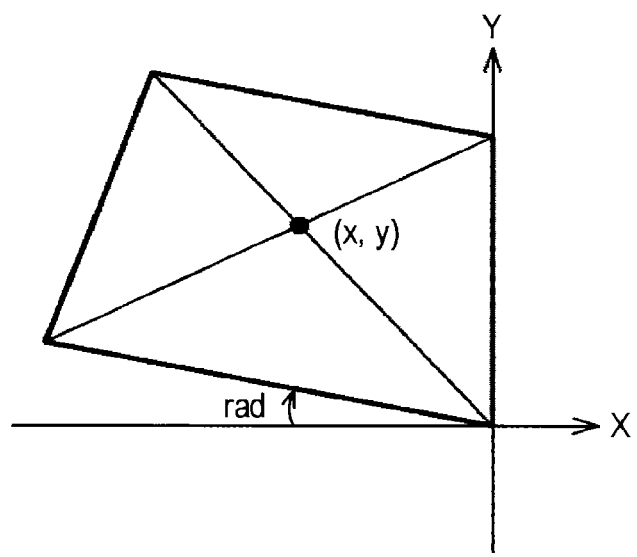
FIG. 6 illustrates a detection result in a rectangular cooked food region.

FIG. 5 illustrates an example of the position of the cooked food region x and y and the angle rad included in the detection result when a circular cooked food region is detected. FIG. 6 illustrates an example of the position of the cooked food region x and y and the angle rad included in the detection result when a rectangular cooked food region is detected.

The description returns to FIG. 2. The characteristic amount generation unit 13 generates a characteristic amount for each cooked food region thus detected. Specifically, the characteristic amount generation unit 13 has a built-in identifier 13A identifying a cooked food appearing in a cooked food region as a single object, and uses the identification result of the identifier 13A as a portion of the characteristic amount of the cooked food region.

The identifier 13A has learned by machine learning (boosting, random forest, and the like) using cooked food images for learning obtained by imaging respective single cooked foods in a plurality N of cooked food classes (types). Accordingly, when identifying the type of cooked food in the cooked food region by the identifier 13A, identification scores representing a degree of matching of the cooked food region to the plurality N of respective cooked food classes are outputted as an identification result. In other words, the identifier 13A outputs an N dimensional vector with elements of the identification scores of the cooked food region for the plurality N of respective cooked food classes as a portion of the characteristic amount for each cooked food region thus detected.

FIG. 7 illustrates one example of cooked food classes to be learned in advance by the identifier 13A. In a case of the present embodiment, as shown in FIG. 7, the cooked food classes are 16 classes of cooked rice, bowl of rice with toppings, bean paste soup, soup, thick wheat noodle, buckwheat noodle, ramen noodle, pasta, meat dish, seafood dish, vegetable dish, salad, fruit, dessert, beverage, and boxed meal. Naturally, the number and names of the cooked food classes are not limited to them.

In the characteristic amount generation unit 13, instead of generating a portion of the characteristic amount for each cooked food region using the identifier 13A, an existing image characteristic amount extraction technique (one using color information, texture information, edge information, and the like) may also be employed.

The characteristic amount generation unit 13 further couples the detection result (five dimensional vector) of the cooked food region by the cooked food region detection unit 12 with the identification result (16 dimensional vector) by the identifier 13A for each cooked food region to generate the characteristic amount (21 dimensional vector) as shown in FIG. 8 and output it to the combined characteristic amount generation unit 14.

The combined characteristic amount generation unit 14 generates a combined characteristic amount corresponding to the cooked food image by coupling the characteristic amount (21 dimensional vector) generated for each cooked food region of the cooked food image in an order of larger areas of corresponding cooked food region. The generated combined characteristic amount is outputted to the combined characteristic amount identifier 16 in the learning process and to the combination identification unit 17 in the identification process.

When a plurality M of cooked food regions are detected from the cooked food image, an M×21 dimensional vector is generated as the combined characteristic amount, while the operation amount at a later stage turns out to be enormous depending on the value of M. With that, in the present embodiment, among the cooked food regions detected from the cooked food image, the first two characteristic amounts in the order of larger areas are coupled to generate a combined characteristic amount in a 42 (=2×21) dimensional vector.

The label setting unit 15 notifies the combined characteristic amount identifier 16 of the cooked food combination label representing the combination of the cooked foods (cooked food combination class) appearing in the cooked food image for learning in the learning process.

Figure 9:
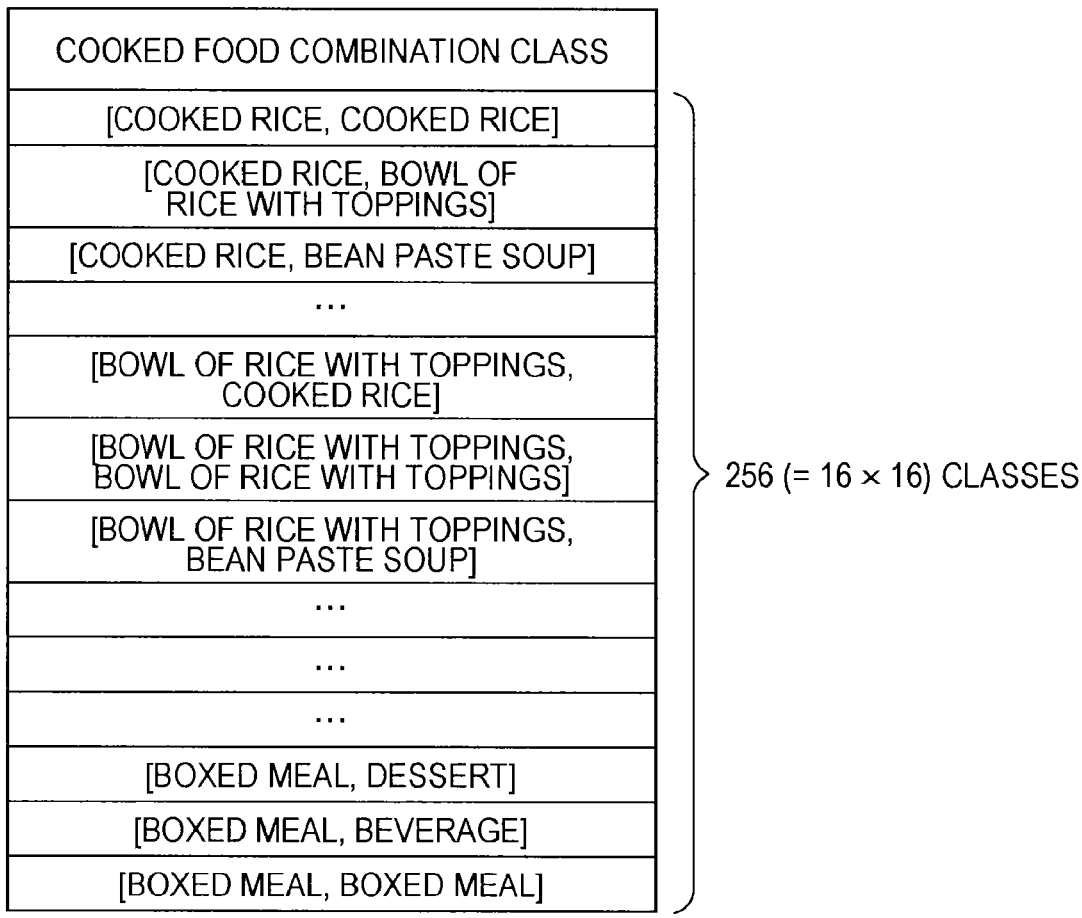
FIG. 9 illustrates cooked food combination classes.

FIG. 9 illustrates one example of cooked food combination classes. It should be noted that FIG. 9 corresponds to the case of 16 classes of the cooked food classes as shown in FIG. 7, and the number of the cooked food combination classes is supposed to be 256 (=16×16) classes allowing a combination of a same cooked food. In the indication of a cooked food combination class label, two types of cooked food names are listed in the order of larger areas occupying the cooked food image.

The combined characteristic amount identifier 16 carries out machine learning (boosting, random forest, and the like) using the combined characteristic amount for the cooked food image for learning and the cooked food combination label for the cooked food image for learning notified from the label setting unit 15 as inputs in the learning process. In the identification process, the combined characteristic amount identifier 16 uses the combined characteristic amount for the cooked food image subjected to identification as an input to output identification scores representing the degrees of matching of the cooked food image subjected to identification to each of the cooked food combination classes (256 classes) as the identification result.

The combination identification unit 17 inputs the combined characteristic amount for the cooked food image subjected to identification to the combined characteristic amount identifier 16 in the identification process, and outputs the identification scores for 256 classes outputted from the combined characteristic amount identifier 16 in response to the label determination unit 18.

The label determination unit 18 determines a combined cooked food label for the cooked food image subjected to identification based on the identification scores for 256 classes, which are the identification results of the combined characteristic amount identifier 16 to output the determination result to the presentation unit 19. Specifically, among the combined cooked food labels of 256 classes, the highest identification score is determined as the combined cooked food label for the cooked food image subjected to identification. Alternatively, among the combined cooked food labels of 256 classes, all having the identification scores at a predetermined threshold or higher, or one having the largest value obtained by multiplying the identification score by a given joint occurrence probability of a same cooked food may also be determined as the combined cooked food label for the cooked food image subjected to identification.

The presentation unit 19 presents the determination result by the label determination unit 18 to the user.

[Description on Behavior]

Next, behaviors of the cooked food identification device 10 are described.

Figure 10:
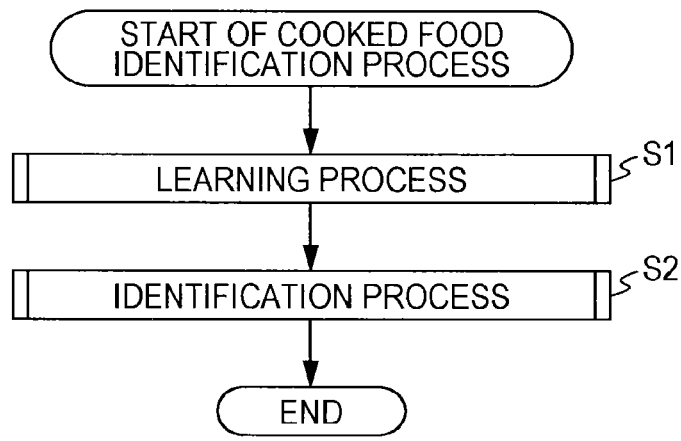
FIG. 10 is a flowchart describing cooked food identification process.

FIG. 10 is a flowchart describing cooked food identification process by the cooked food identification device 10.

In the cooked food identification process, learning process to make the combined characteristic amount identifier 16 learn is carried out as step S1, followed by identification process for the cooked food image subjected to identification as step S2. In the learning process, the learning process using a predetermined number of cooked food images for learning is carried out, and even at a stage of the identification process, the learning process may also be executed continuously using further cooked food images for learning as inputs. By continuing the learning process, the identification accuracy of the combined characteristic amount identifier 16 can be improved.

Figure 11:
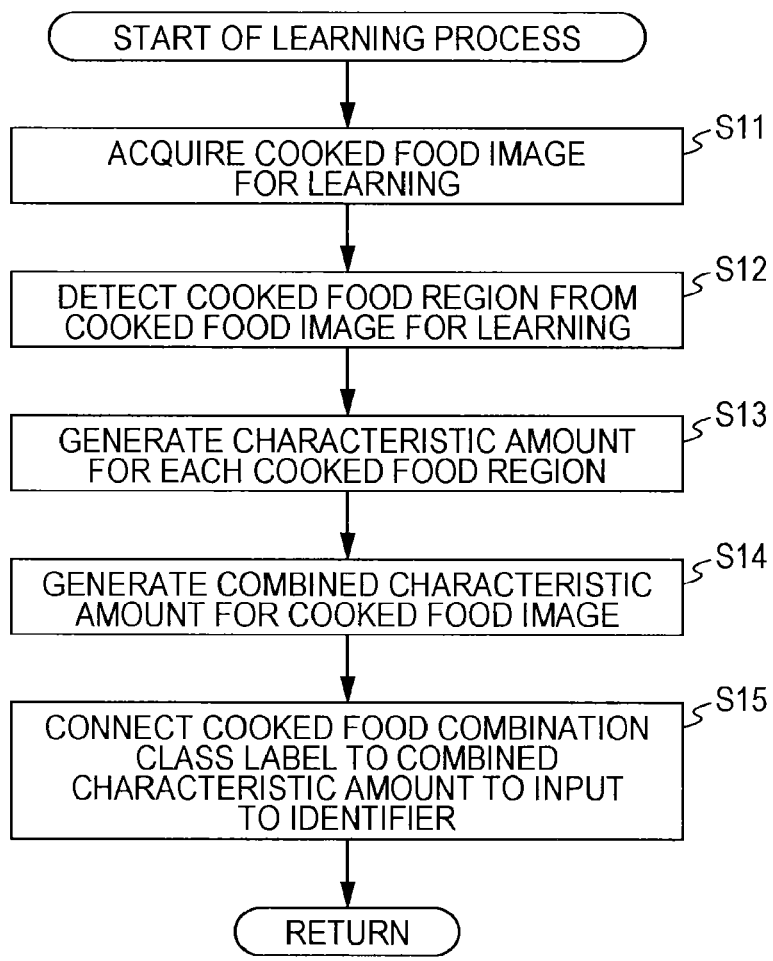
FIG. 11 is a flowchart describing learning process.

FIG. 11 is a flowchart describing the learning process described above in step S1.

In step S11, the cooked food image acquisition unit 11 acquires a cooked food image for learning to output it to the cooked food region detection unit 12.

In step S12, the cooked food region detection unit 12 detects a cooked food region from the cooked food image to output a five dimensional vector for each cooked food region as the detection result to the characteristic amount generation unit 13. In step S13, the characteristic amount generation unit 13 couples the identification result (16 dimensional vector) of the identifier 13A to the detection result (five dimensional vector) of the cooked food region by the cooked food region detection unit 12 as a characteristic amount for each cooked food region thus detected, so that a 21 dimensional vector is generated to be outputted to the combined characteristic amount generation unit 14.

In step S14, the combined characteristic amount generation unit 14 couples respective characteristic amounts (21 dimensional vectors) corresponding to the first two larger areas of the cooked food regions in the cooked food image, so that a combined characteristic amount (42 dimensional vector) corresponding to the cooked food image is generated to be outputted to the combined characteristic amount identifier 16.

In step S15, the label setting unit 15 notifies the combined characteristic amount identifier 16 of a cooked food combination label representing the combination of cooked foods (cooked food combination class) appearing in the cooked food image for learning. The combined characteristic amount identifier 16 carries out machine learning using the combined characteristic amount for the cooked food image for learning and the cooked food combination label for the cooked food image for learning notified from the label setting unit 15 as inputs. This is the end of the description on the learning process. In order to improve the identification accuracy by the combined characteristic amount identifier 16, it is desired to repeatedly execute the processes described above in steps S11 through S15.

Figure 12:
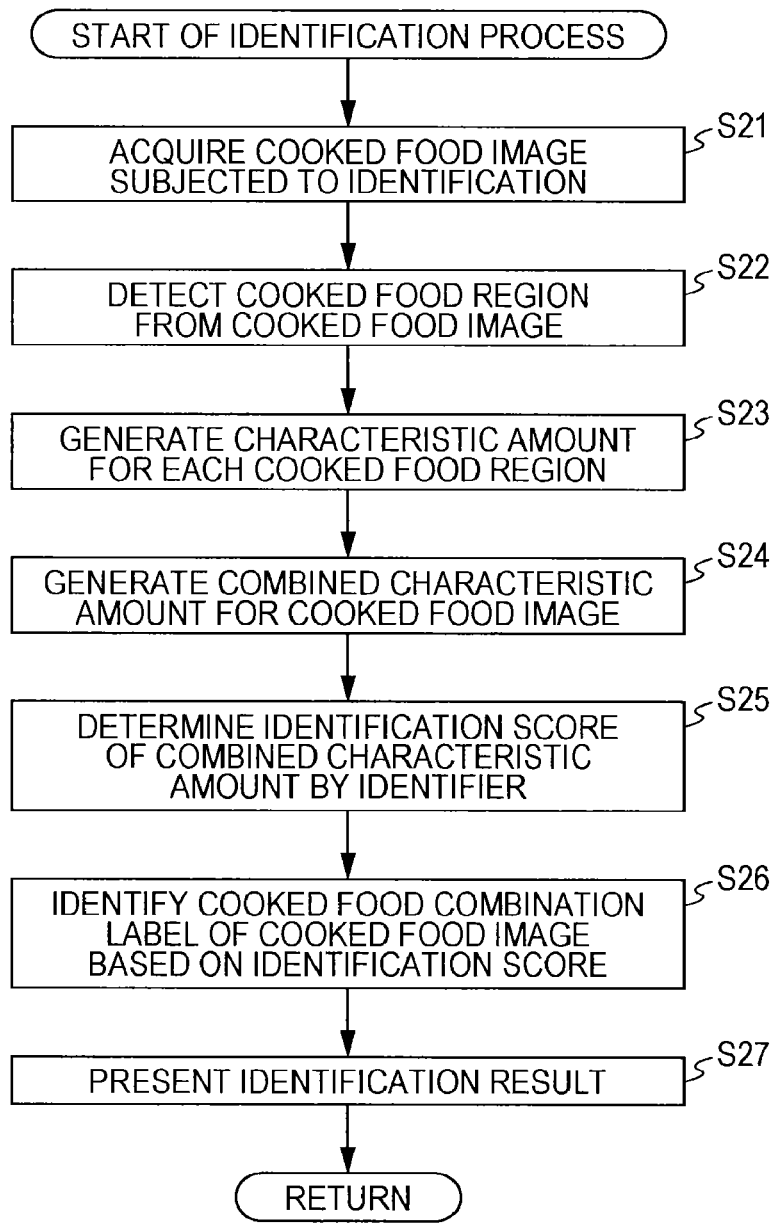
FIG. 12 is a flowchart describing identification process.

FIG. 12 is a flowchart describing the identification process described above in step S2.

In step S21, the cooked food image acquisition unit 11 acquires a cooked food image subjected to identification to output it to the cooked food region detection unit 12.

In step S22, the cooked food region detection unit 12 detects a cooked food region from the cooked food image to output a five dimensional vector for each cooked food region as the detection result to the characteristic amount generation unit 13. In step S23, the characteristic amount generation unit 13 couples the identification result (16 dimensional vector) of the identifier 13A to the detection result (five dimensional vector) of the cooked food region by the cooked food region detection unit 12 as a characteristic amount for each cooked food region thus detected, so that a 21 dimensional vector is generated to be outputted to the combined characteristic amount generation unit 14.

In step S24, the combined characteristic amount generation unit 14 couples the respective characteristic amounts corresponding to the first two larger areas of the cooked food regions in the cooked food image, so that a combined characteristic amount corresponding to the cooked food image is generated to be outputted to the combination identification unit 17. In step S25, the combination identification unit 17 inputs the combined characteristic amount for the cooked food image subjected to identification to the combined characteristic amount identifier 16, and outputs identification scores for 256 classes outputted from the combined characteristic amount identifier 16 in response to the label determination unit 18.

In step S26, the label determination unit 18 determines a combined cooked food label for the cooked food image subjected to identification based on the identification scores from the combined characteristic amount identifier 16 to output the determination result to the presentation unit 19. In step S27, the presentation unit 19 presents the determination result by the label determination unit 18 to the user. This is the end of the description on the identification process.

According to the identification process described above, it is possible to present the combination of cooked foods appearing in the cooked food image subjected to identification to a user.

After identifying the combined cooked food label, it is also possible to individually determine the type of each cooked food (cooked food label) appearing in the cooked food image subjected to identification.

When the number of the cooked foods appearing in the cooked food image subjected to identification is two or less, the aligned cooked food labels may be connected from the left of the identified combined cooked food label in the order of larger areas of cooked food regions.

Figure 13:
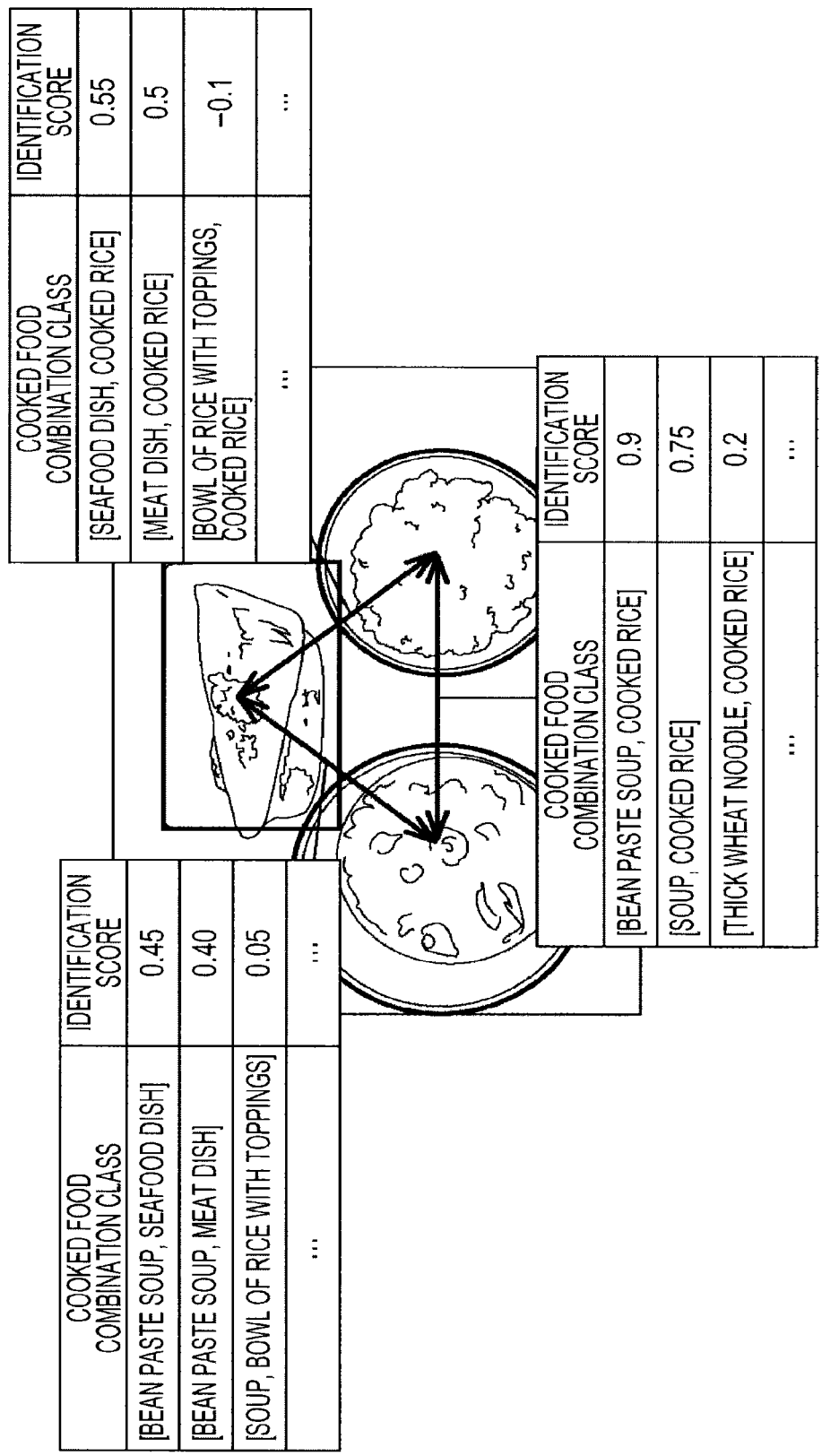
FIG. 13 illustrates an example of identifying a cooked food in a cooked food image as a single object.

When the number of the cooked foods appearing in the cooked food image subjected to identification is three, as illustrated in FIG. 13, combined characteristic amounts are generated by combining each two of the three detected cooked food regions in a best subset selection procedure and are inputted them to the combined characteristic amount identifier 16 to obtain identification scores for 256 classes. Next, a total value of the identification scores for assigning all (16 classes of) cooked food labels to each of the three cooked food regions is calculated to determine the combined cooked food label corresponding to the combination having the largest total value as the combined cooked food label for the cooked food image subjected to identification.

Figure 14:
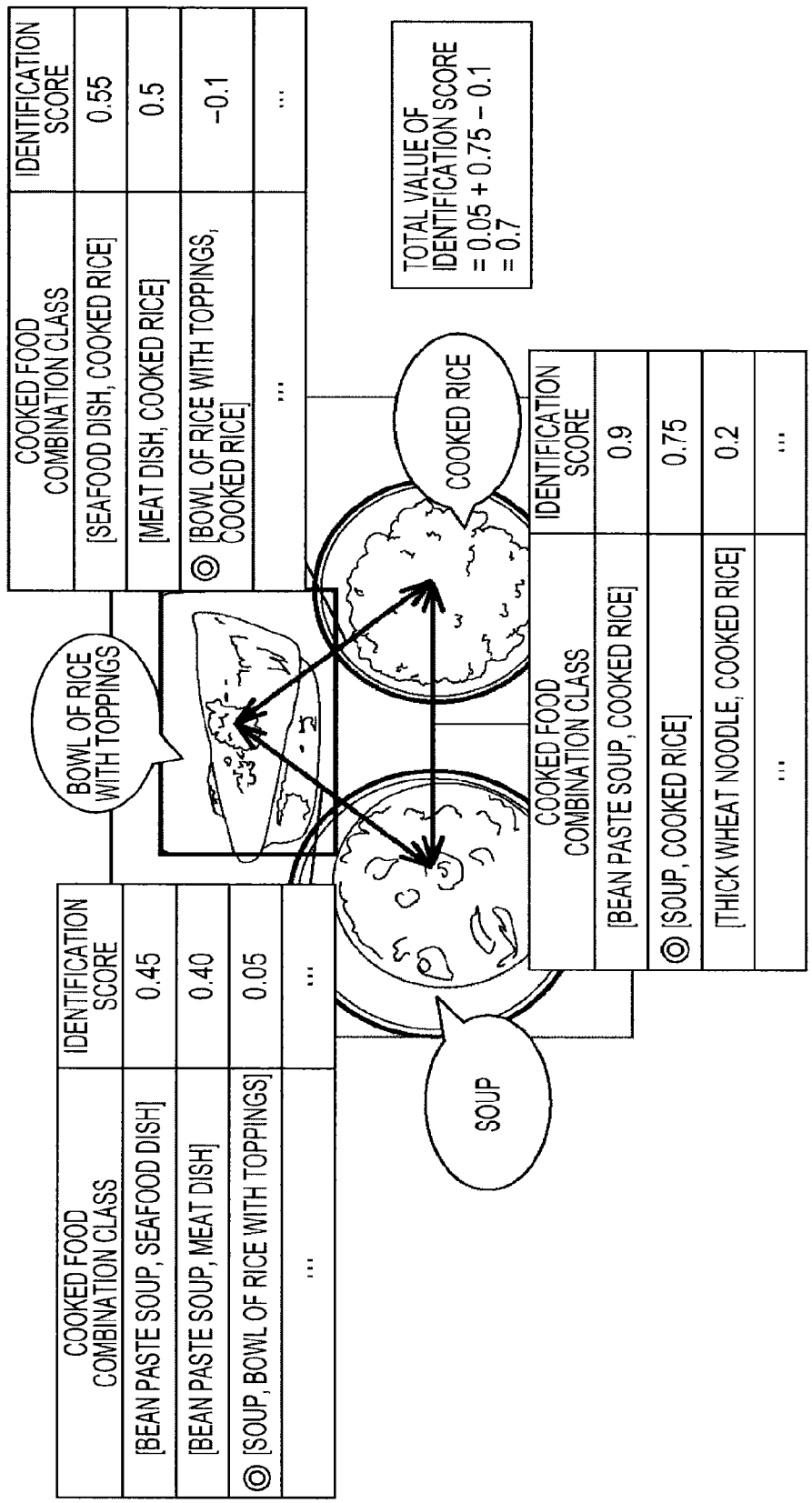
FIG. 14 illustrates an example of identifying a cooked food in a cooked food image as a single object.

For example, FIG. 14 is a case of assigning a cooked food label "bowl of rice with toppings" to the upper cooked food region in the cooked food image subjected to identification, a cooked food label "soup" to the left cooked food region, and a cooked food label "cooked rice" to the right cooked food region. In this case, the total value of the identification scores becomes 0.7.

Figure 15:
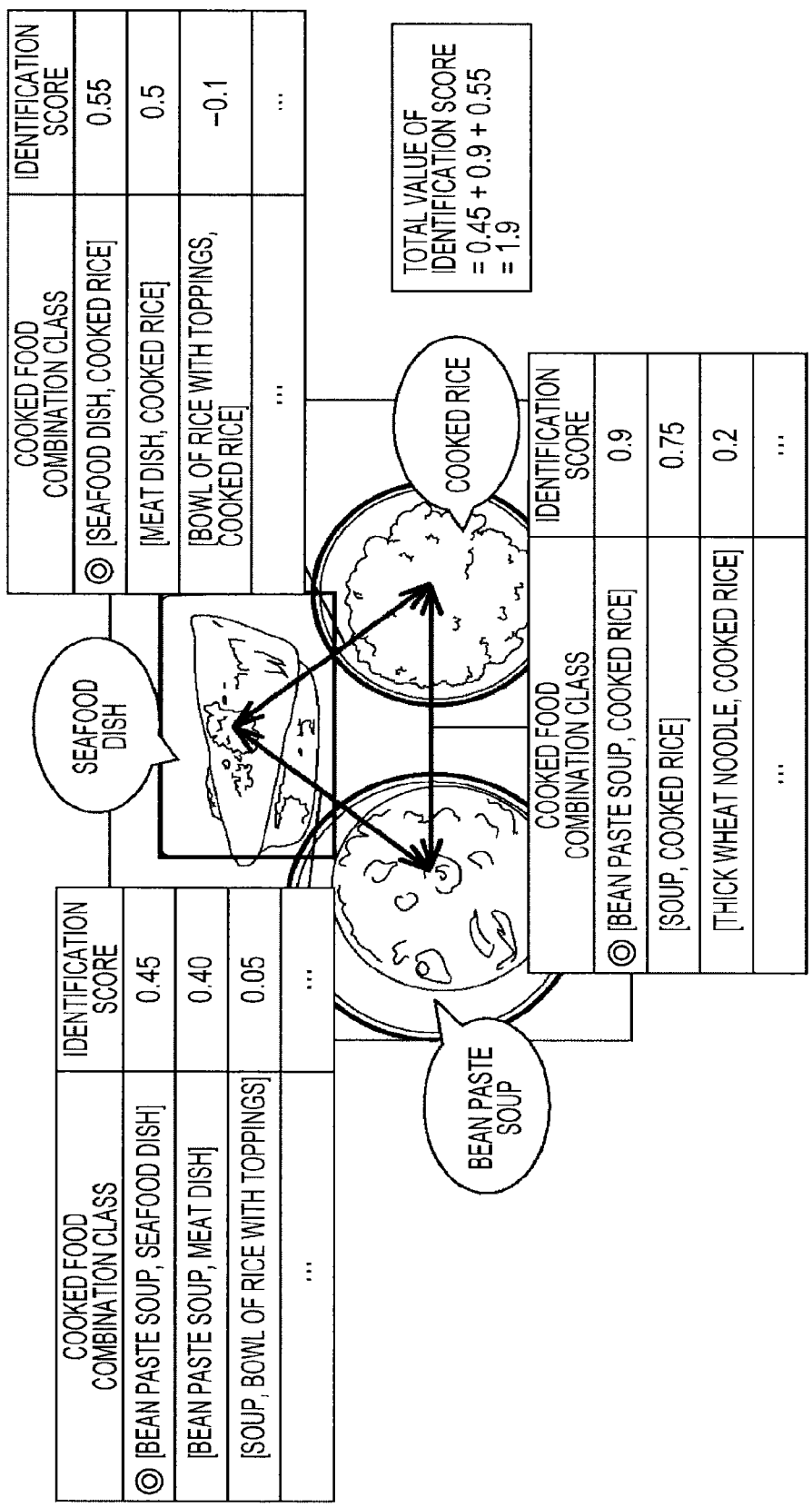
FIG. 15 illustrates an example of identifying a cooked food in a cooked food image as a single object.

Still for example, FIG. 15 is a case of assigning a cooked food label "seafood dish" to the upper cooked food region in the cooked food image subjected to identification, a cooked food label "bean paste soup" to the left cooked food region, and a cooked food label "cooked rice" to the right cooked food region. In this case, the total value of the identification scores becomes 1.9 and it is the largest value, and thus the combined cooked food label for the cooked food image subjected to identification becomes "bean paste soup, seafood dish", "bean paste soup, cooked rice", and "seafood dish, cooked rice". Since it is understood that the areas of the corresponding cooked food regions are larger in the order of bean paste soup, seafood dish, and cooked rice from the order of the cooked food labels in these three combined cooked food labels, each type of cooked food can be identified individually.

When further identifying each cooked food individually after thus identifying the combined cooked food label, even the concepts of placement of cooked foods and collection of foods to be eaten (combination) are adopted in this identification result, so that it is possible to individually identify a type of cooked food with higher accuracy than an existing identifier (for example, the identifier 13A built in the characteristic amount generation unit 13).

According to the cooked food identification device 10 described above, it is possible to identify a combination of cooked foods at a higher speed and with a less memory usage without processing an image per pixel by using an identification score of a cooked food label for a single cooked food as the characteristics of the cooked food region.

Modifications

Next, modifications of the cooked food identification device as an embodiment are described.

Figure 16:
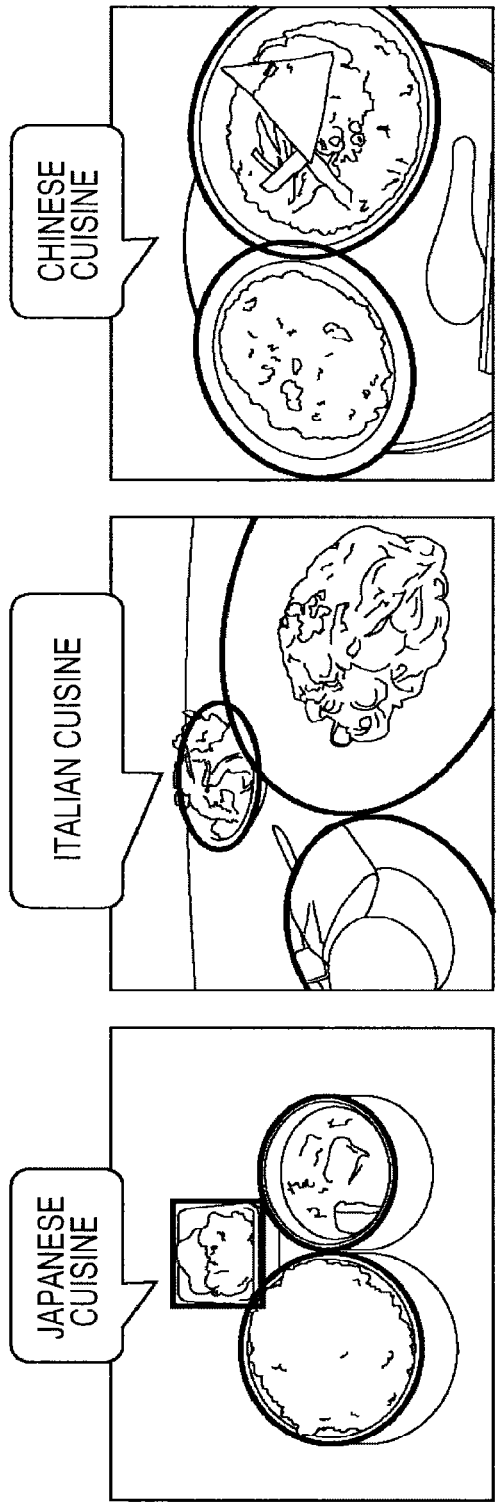
FIG. 16 illustrates an identification result of a cooked food category for a cooked food image.

In the cooked food identification process described above, a combination of cooked foods (cooked food combination label) appearing in a cooked food image subjected to identification is identified. As a modification, as illustrated in FIG. 16, it is also possible to identify a cooked food category (Japanese cuisine, Chinese cuisine, French cuisine, Thai cuisine, Korean cuisine, and the like) of a combination of cooked foods appearing in a cooked food image subjected to identification.

For implementation of this, the number of characteristic amounts to be combined in the combined characteristic amount generation unit 14 is increased (for example, five) to generate a combined characteristic amount in a 105 (=21×5) dimensional vector. It should be noted that, when the number of cooked food regions is less than five, an arbitrary value is substituted as an element in the combined characteristic amount.

In the label setting unit 15, a label representing any of cooked food category classes as shown in FIG. 17, for example, may be set to make the combined characteristic amount identifier 16 subjected to machine learning using this label.

As other modifications, it is also possible to identify a cooked food eating time zone category (breakfast, lunch, snack, dinner, late night snack, and the like) appearing in a cooked food image subjected to identification, and to identify a name of combination (combination meal with grilled fish, a set meal of ramen noodle and fried rice, and the like) of cooked foods appearing in a cooked food image subjected to identification.

The series of processing described above can be executed by hardware and can also be executed by software. When executing the series of processing by software, programs configuring the software are installed on a computer. Here, such computer includes a computer mounted in hardware for exclusive use and, for example, a general purpose personal computer capable of executing various functions by installing various programs thereon.

Figure 18:
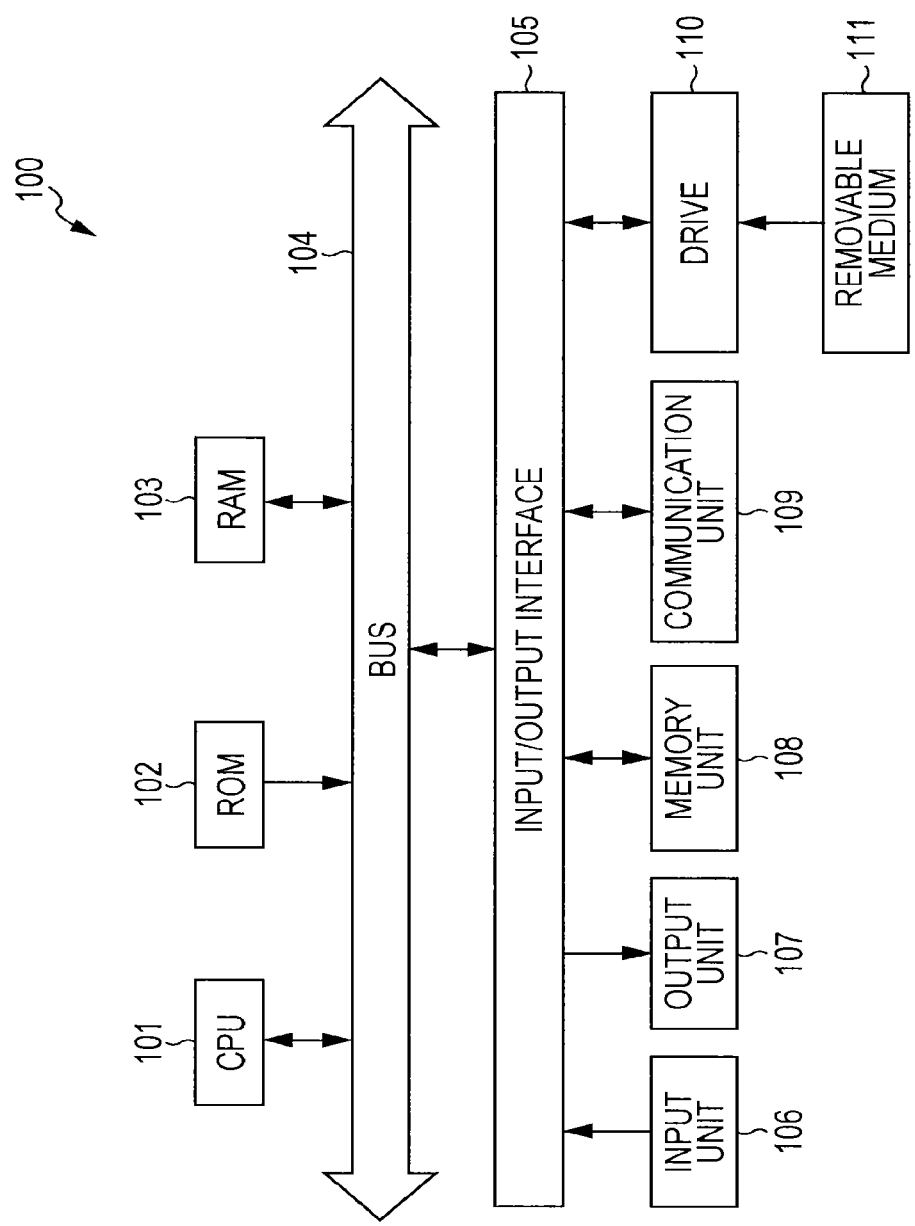
FIG. 18 is a block diagram illustrating a configuration example of a computer.

FIG. 18 is a block diagram illustrating a hardware configuration example of a computer to execute the series of processing described above by a program.

In the computer, a CPU (central processing unit) 101, a ROM (read only memory) 102, and a RAM (random access memory) 103 are connected to each other by a bus 104.

The bus 104 is further connected to an input/output interface 105. The input/output interface 105 is connected to an input unit 106, an output unit 107, a memory unit 108, a communication unit 109, and a drive 110.

The input unit 106 includes a keyboard, a mouse, a microphone, and the like. The output unit 107 includes a display, a speaker, and the like. The memory unit 108 includes a hard disk, a non-volatile memory, and the like. The communication unit 109 includes a network interface and the like. The drive 110 drives a removable medium 111, such as a magnetic disk, an optical disk, a magnetooptical disk, or a semiconductor memory.

In a computer configured as above, the CPU 101 loads, for example, a program memorized in the memory unit 108 via the input/output interface 105 and the bus 104 into the RAM 103 for execution, thereby carrying out the series of processing described above.

The program executed by the computer may be a program processing in time series in the order described herein or may also be a program processing in parallel or at a desired timing, such as on-call.

Embodiments of the present disclosure are not limited to the embodiments described above, but various modifications are possible within the scope of the spirit of embodiments of the present disclosure.

The present disclosure contains subject matter related to that disclosed in Japanese Priority Patent Application JP 2011-192336 filed in the Japan Patent Office on Sep. 5, 2011, the entire contents of which are hereby incorporated by reference.

The invention claimed is:

1. An information processor, comprising:
circuitry configured to:
detect a plurality of individual regions of an image, wherein each of the plurality of individual regions supports one of a plurality of subjects of the image;
generate a respective characteristic amount for each of the plurality of individual regions detected, wherein the characteristic amount is generated based on one or more of positional information of a respective individual region and an area of the respective individual region;
generate a combined characteristic amount that corresponds to the image, wherein the combined characteristic amount is generated based on a combination of the characteristic amounts for at least two individual regions having largest areas among areas of the plurality of individual regions; and determine a label that corresponds to a combination of the subjects supported by the at least two individual regions, appearing in the image, based on the generated combined characteristic amount, wherein the image is a cooked food image having a cooked food as the subject supported by each of the plurality of detected individual regions, and the circuitry is further configured to detect individual plates in the cooked food image as the individual regions.

2. The information processor according to claim 1, wherein the circuitry is further configured to carry out machine learning based on the label and the combined characteristic amount corresponding to the image for learning as inputs.

3. The information processor according to claim 1, wherein the circuitry is further configured to generate the characteristic amount based on a combination of at least the positional information of the individual regions and an identification result of the subject for each of the plurality of detected individual regions.

4. The information processor according to claim 1, wherein the circuitry is further configured to generate the characteristic amount based on a combination of the at least positional information of the individual regions and an image characteristic of the subject supported by each of the plurality of detected individual regions.

5. The information processor according to claim 1, wherein the circuitry is further configured to detect a shape of the plurality of individual regions and the positional information is detected as being center coordinates for each of the plurality of individual regions.

6. An image processing method, comprising:

detecting at least a relative area and positional information for each of a plurality of individual regions of an image, each of the plurality of individual regions appearing in the image as individually supporting one of a plurality of subjects;

generating a respective characteristic amount for each of the plurality of detected individual regions, wherein the characteristic amount is generated based on one or more of the positional information of a respective individual region and the relative area of the respective individual region;

generating a combined characteristic amount corresponding to the image, wherein the combined characteristic amount is generated by combining the characteristic amount generated for at least two individual regions having largest relative areas among relative areas of the plurality of individual regions; and determining a label corresponding to a combination of the subjects supported by the at least two individual regions, appearing in the image, based on the generated combined characteristic amount, wherein the image is a cooked food image having a cooked food as the subject supported by each of the plurality of detected individual regions, and the individual plates in the cooked food image is detected as the individual regions.

7. The method according to claim 6, wherein generating the characteristic amount includes combining at least the positional information of the individual regions and an identification result of the subject for each of the detected individual regions.

8. The method according to claim 6, wherein generating the characteristic amount includes combining at least the positional information of the individual regions and an image characteristic of the subject supported by each of the plurality of individual detected regions.

9. The method according to claim 6, further comprising detecting a shape for the plurality of individual regions and wherein the positional information is detected as being center coordinates for each of the plurality of individual regions.

10. A non-transitory computer-readable medium having a set of computer-executable instructions embodied thereon that, when executed, cause a computer to perform operations, comprising:

detecting at least a relative area and positional information for each of a plurality of individual regions of an image, each of the plurality of individual regions appearing in the image as individually supporting one of a plurality of subjects;

generating a respective characteristic amount for each of the plurality of detected individual regions, wherein the characteristic amount is generated based on one or more of the positional information of a respective individual region and the relative area of the respective individual region;

generating a combined characteristic amount corresponding to the image, wherein the combined characteristic amount is generated by combining the characteristic amount generated for at least two subjects supported by the individual regions having largest relative areas among relative areas of the plurality of individual regions; and determining a label corresponding to a combination of the subjects supported by the at least two individual regions appearing in the image based on the generated combined characteristic amount, wherein the image is a cooked food image having a cooked food as the subject supported by each of the plurality of detected individual regions, and the individual plates in the cooked food image is detected as the individual regions.

* * * * *